March 26, 1940. F. ZAHREN 2,195,044
TWO-STROKE INTERNAL COMBUSTION ENGINE AND METHOD FOR OPERATING THE SAME
Filed Dec. 17, 1937 5 Sheets-Sheet 1

Inventor:
Franz Zahren
BY Hammond & Littell
ATTORNEYS

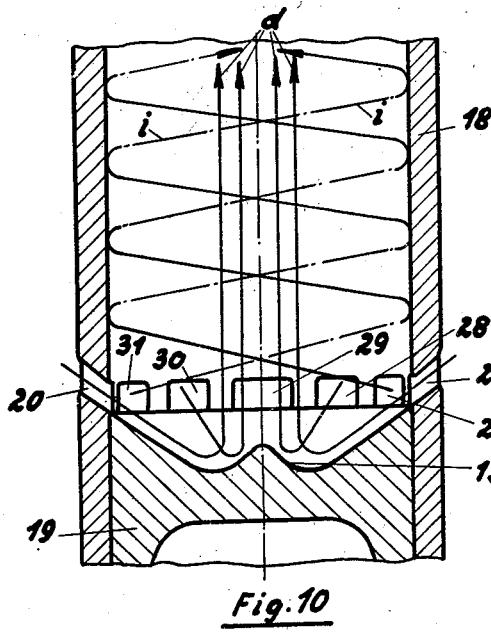
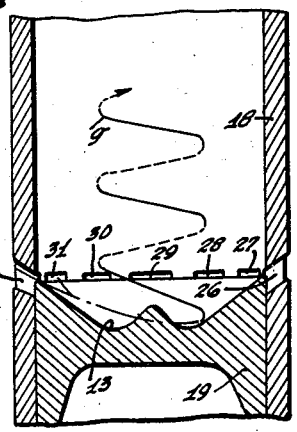
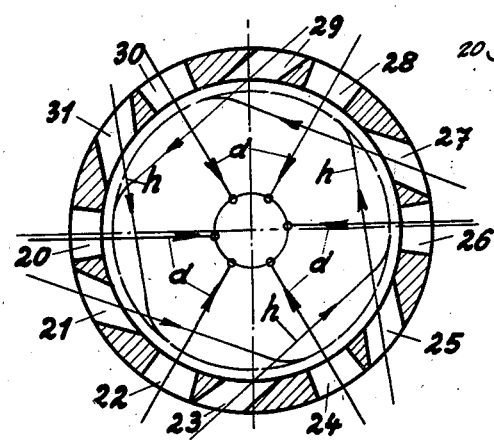
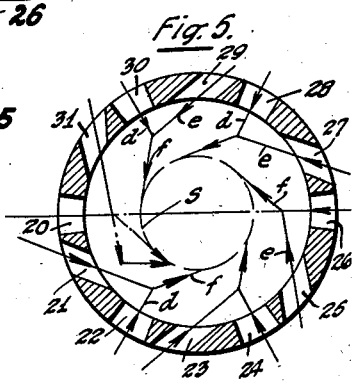
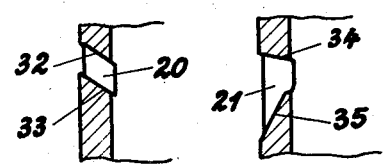

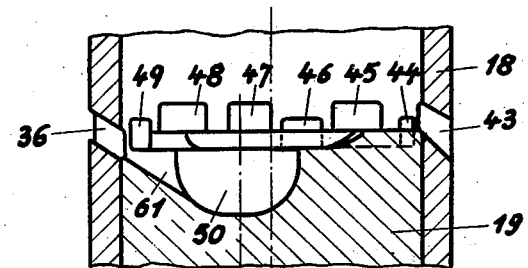
Fig. 11
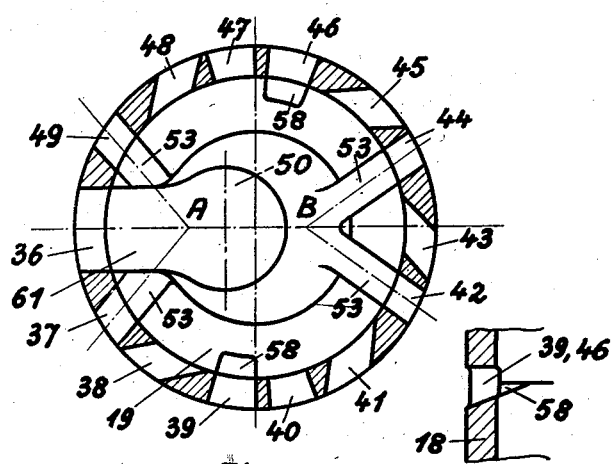
Fig. 12  Fig. 14
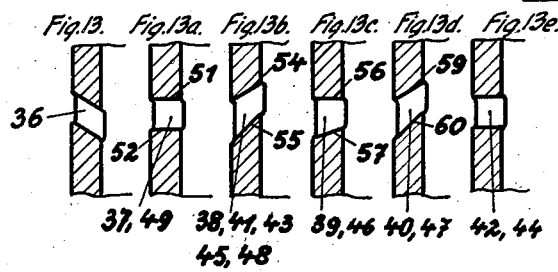

March 26, 1940.  F. ZAHREN  2,195,044
TWO-STROKE INTERNAL COMBUSTION ENGINE AND METHOD FOR OPERATING THE SAME
Filed Dec. 17, 1937  5 Sheets-Sheet 4

Inventor:
Franz Zahren
BY
Hammond & Littell
ATTORNEYS

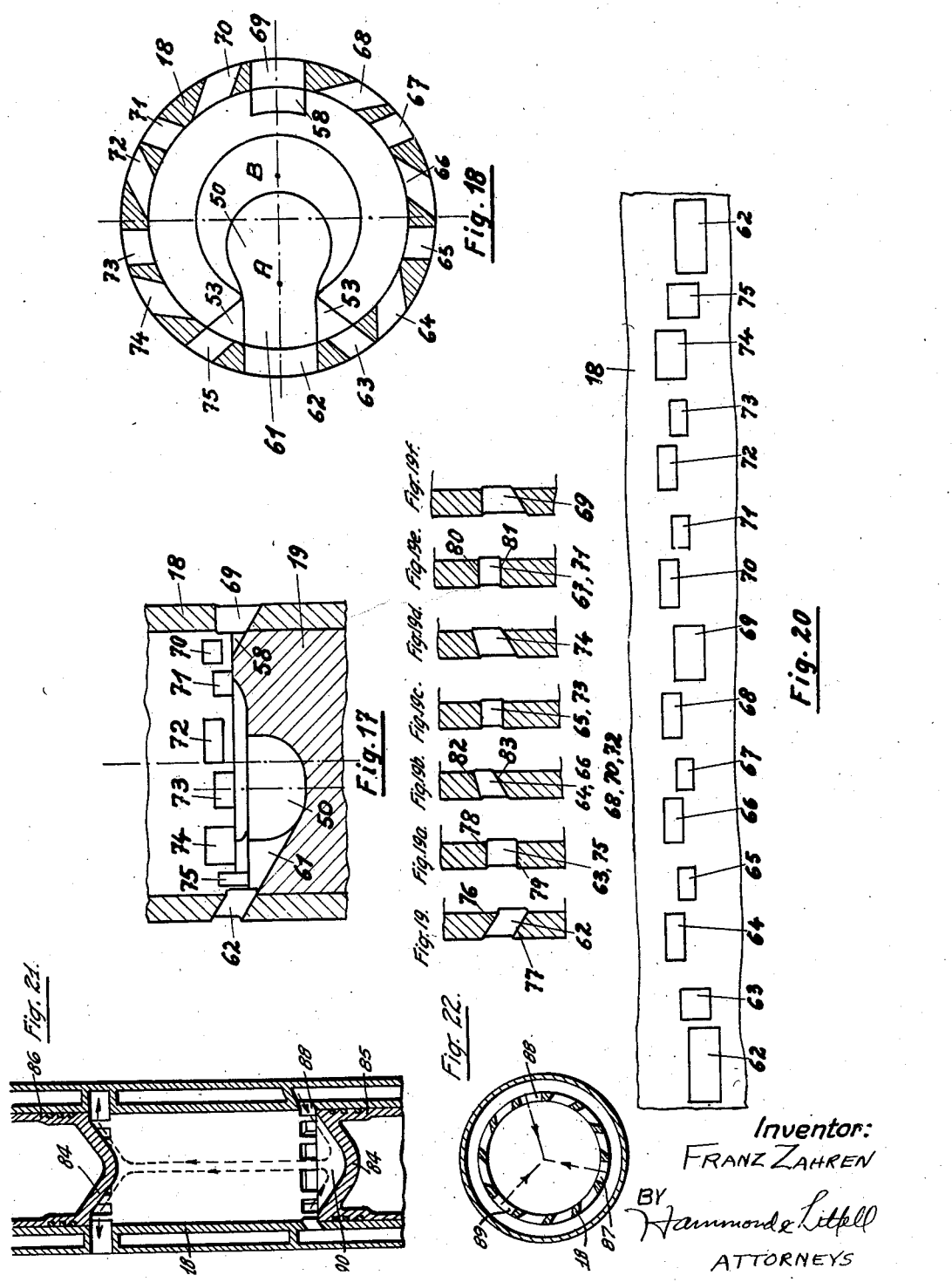

Patented Mar. 26, 1940

2,195,044

UNITED STATES PATENT OFFICE 2,195,044

TWO-STROKE INTERNAL COMBUSTION ENGINE AND METHOD FOR OPERATING THE SAME

Franz Zahren, Brunswick, Germany, assignor to the firm Bussing-Nag Vereinigte Nutzkraftwagen Aktiengesellschaft, Brunswick, Germany Application December 17, 1937, Serial No. 180,316
In Germany December 19, 1936

12 Claims. (Cl. 123—65)

This invention relates to two-stroke internal combustion engines provided with direct-current scavenging and the method of operating the same.

The difficulties of completely removing the waste gases out of the cylinder of an internal combustion engine provided with direct-current scavenging are well-known. When carrying out the direct-current scavenging by radially directed slots only it is impossible even with inlet slots directed very steeply towards the outlet means to clean up the circumference of the cylinder, as the scavenging slots are still directed to the center of the cylinder. Furthermore by the upward direction of all the slots the effective cross-section of the inlets is reduced resulting in increasing the height of the slots and thereby diminishing their utilizable stroke-volume. On the other hand with only tangentially directed slots it is impossible to scavenge the center of the cylinder. Therefore it has been proposed to employ a hollow piston in connection with tangentially directed inlet slots and to direct all slots towards the bowl. Without taking into account that the scavenging by deflecting all scavenging currents requires a considerable time, the scavenging of the center of the cylinder is not possible in its upper part, as the scavenging air is there by the whirls produced by the rotation projected on to the wall of the cylinder. To avoid this drawback it has been proposed to arrange two or more superimposed rows of slots of which one would be tangentially directed and the other or others less tangentially and radially. This formation of the slots is practically no longer possible in motors of minor size. Moreover hereby the scavenging of a combustion chamber located in the bottom of the piston is likewise impossible if the diameter of the combustion chamber is smaller than that of the piston. Just this formation of a combustion chamber has proved very satisfactory in four-stroke motors. In two-stroke motors it is not found, as the thermic demands upon the piston—already high in a two-stroke engine—cannot be mastered without scavenging and cooling the combustion chamber proper by the scavenging medium. The scavenging methods hitherto used are therefore not suitable for every size of cylinders or for every combustion chamber. Although it has been proposed to arrange radial and tangential slots located in one zone whereby the same scavenging effect shall be obtained as with rows of slots disposed in different zones, a thorough examination of the formation of the slots in one zone has not yet taken place. As a matter of fact, the scavenging effect as in this case would not appear to be the same as in rows of slots located in several zones, but still particular measures and considerations are required.

The invention relates to a method of direct-current scavenging of two-stroke internal combustion engines provided with inlet slots distributed in one row over the whole circumference of the cylinder and controlled by the piston. By my invention it is now possible to thoroughly remove the waste gases from the whole cylinder with the least consumption of scavenging and charging media in the shortest time and with motors of any size and to fill the cylinder with the next charge. Complete scavenging is possible even when the combustion chamber is arranged in the piston and even if in this case the diameter of the combustion chamber is smaller than that of the cylinder.

This is attained according to the present invention by conducting the scavenging medium in single currents through inlet slots, which are radially or tangentially disposed and/or of which two or more are disposed tangentially in opposite directions, and the guiding faces of which run parallel or at different angles with respect to one another, to certain different points of the cylinder in such a manner that the single scavenging currents scavenge the whole contents of the cylinder without disturbing one another, owing to the fact that the slots are differently shaped or offset as to height. The invention further starts from recognizing that the arrangement of the slots and the shaping of the combustion chamber must be harmonized in view of each other and that in this case any shaping of the combustion chamber suitable in the four-stroke system is also suitable in the two-stroke system. The invention is further based upon the recognition that it is also possible, in view of the great number of slots connected with direct-current scavenging, to give a determined direction to all of the scavenging or charging currents or to a certain group of them. This direction is maintained until this current or group of currents meet a current or group of currents disposed in such a manner that they meet the former at a predetermined point of the cylinder. The further direction of these currents or group of currents is the resultant of the single components and can therefore be predetermined when designing the shape and disposal of the slots. Owing to the fact that not one and the same direction is imparted to all scavenging and charging currents, but a certain place in the cylinder is systematically apportioned to every one of them, it is possible to scavenge all points of the cylinder with a slight excess of scavenging medium. Also the formation of whirls of the single currents is reduced if they are distributed over several places, and is easier to be mastered, because the single whirls, unavoidable in the concurrence of a plurality of currents, do not influence or disturb one another. Reducing the formation of whirls, however, assists in reducing the consumption of energy, required for scavenging, as also the consumption of scavenging medium. A small excess of scavenging medium is highly important not only for motors scavenged with a mixture of fuel and air, but also for motors scavenged with air in which the mixture is internally formed. Without taking the higher economy and the smaller weight of the motor into account, a reduced consumption of scavenging medium allows of increasing the number of revolutions and the mechanical effect of the engine. This is especially true of motors provided with inlet slots and outlet valves.

Another means of prescribing the way of the single currents consists in leading the current against the cylinder wall or against a face of the piston and hence through the cylinder.

The annexed drawings show by way of example some modifications of different arrangements and formations of slots in two-stroke internal combustion engines adapted for carrying out the scavenging method according to the present invention.

Figs. 1, 5, 9, 12, and 18 show different cross-sections of the cylinder and the inlet slots of an internal combustion engine.

Figs. 4, 10, 11, and 17 show longitudinal cross-sections of the cylinder, the inlet slots and the piston of internal combustion engines, viz. in the lower dead point position of the piston, with the inlet slots fully opened.

Fig. 8 is a longitudinal cross-section similar to Fig. 10, but with the inlet slots only partially opened by the piston.

Figs. 2, 3, 6, 7, 13, 13a, 13b, 13c, 13d, 13e, 14, 19, 19a, 19b, 19c, 19d, 19e and 19f are longitudinal cross-sections every one of which shows a cylinder wall and one slot.

In Fig. 16 the arrows indicate the partial currents of the scavenging medium conducted through the single slots.

Fig. 20 shows the developed mantle of the cylinder according to Fig. 18, with the single inlet slots.

Fig. 21 is a longitudinal cross-section of a double-piston machine, whereas

Fig. 22 is a corresponding transverse section.

Figure 4:
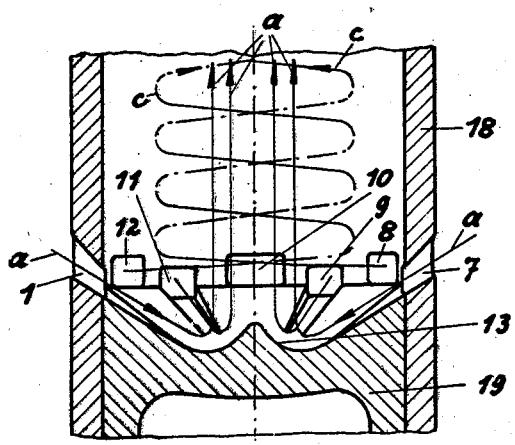
Figure 1:
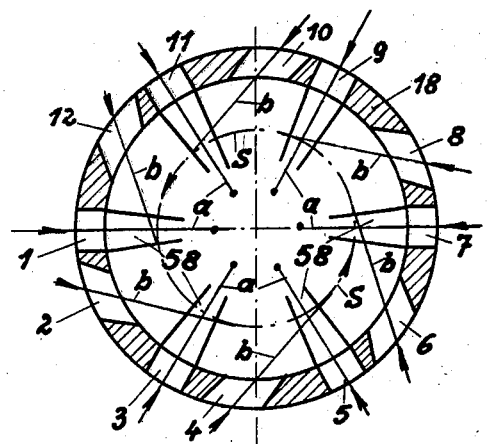
Figures 2, 3:
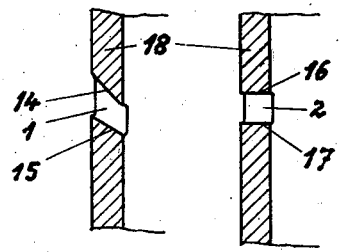

The modification shown in Figs. 1 to 4 relates to a machine having a hollow piston, i. e. a bowl-shaped combustion space concentrically disposed in the bottom of the piston. The inlet slots 1 to 12 distributed along the periphery of the cylinder are alternately directed towards the axis or away from it. The former 1, 3, 5, 7, 9, and 11 (Fig. 1) are all directed downwards into the combustion chamber 13 provided on the bottom of the piston. Furthermore these slots are arranged lower than the slots 2, 4, 6, 8, 10, and 12 as especially seen from Fig. 4. However by the cavities 58 provided in the piston 19 I obtain the result that the "radial" slots are opened simultaneously with the "tangential" slots. ("Tangential" in this connection means that the lines representing the average direction of the streaming gas in the slots touch a mathematical cylinder coaxial with and having a smaller diameter than the working cylinder of the machine. "Radial" means that such lines intersect the axis of the working cylinder.) The upper faces 14 of the "radial" slots pass steeper downwards than the lower faces 15 of the slots (Fig. 2). Hereby I attain that at first on opening the slots the partial currents a conducted through the "radial" slots are directed towards the lowest points of the combustion chamber 13, but on further opening the slots these currents become flatter and flatter, so as to comprise nearly the whole contents of the bowl-shaped combustion chamber 13. Figs. 1 and 4 show that the single partial currents a meet in the center of the cylinder, mutually erect themselves and completely scavenge the core of waste gases.

The "tangential" inlet slots 2, 4, 6, 8 and 10, 12 touch, for example, the same mathematical cylinder (Fig. 1). The upper and the lower faces 16 and 17 of these slots go parallel or nearly parallel with respect to each other and are disposed, as shown in Fig. 3, vertically or nearly vertically to the longitudinal axis of the cylinder.

The partial currents b conducted through the tangential slots flow above the radial currents a so that an undisturbed course of the single currents is warranted. The tangential scavenging currents b are directed towards the cylinder wall 18, but do not attain it because they previously meet another tangential partial current and both currents deflect each other. By this deflection a whirl of rotation c is produced spaced from the cylinder wall 18, rotating along a line of gravity S and tending towards the outlet means (Fig. 1). By suitably forming and disposing the tangential slots one or more whirls of rotation may be produced more or less distant from the cylinder wall. A mutual disturbance of these whirls can be avoided by more or less inclining the upper and lower faces of the slots, and by making the lines of direction touch a mathematical cylinder of greater or smaller diameter. To obtain one or more whirls along one or more lines of points of gravity one or more radial slots, having accordingly inclined upper or lower faces 14 and 15, may be employed.

Figs. 5 to 10 likewise illustrate a modification comprising a machine having a hollow piston and a combustion chamber concentrically arranged in the bottom of the piston. Along the periphery of the cylinder, slots 20 to 31 are disposed having an equal height and all being simultaneously opened by the piston 19. The slots disposed side by side upon the cylinder wall 18 are alternatively tangentially and radially directed (Figs. 5 and 9). The radial slots 20, 22, 24, 26, 28, and 30 are all directed upon the bowl-shaped combustion chamber 13, i. e. downwards, and their upper and lower faces are parallel or nearly parallel to each other (Fig. 6). The lines representing the direction of the tangential slots 21, 23, 25, 27, 29, and 31 touch the same mathematical cylinder (Figs. 5 and 9). The faces 34 and 35 of these slots form different angles with the longitudinal axis of the working cylinder. The lower faces 35 are more inclined towards the outlet means of the cylinder than the upper faces 34; the latter may even be inclined slightly downwards (Fig. 7).

When the opening of the slots begins (Figs. 5 and 8) the partial currents d of the radial slots are conducted downwards into the combustion chamber 13. But as also in this position of the piston only the upper faces 34 of the tangential slots affect the direction of their partial currents, also the tangential currents e are conducted slightly downwards to the combustion chamber 13. Within this space the single radial and tangential currents d and e meet and deflect one another (see the direction of the arrows f in Fig. 5). The resultant produces a whirl of rotation g (Fig. 8) of small diameter in which the radial currents are involved after having passed the undermost portions of the combustion room 13. This whirl passes, owing to the mutual deflection of the single partial currents, on a line of points of gravity S (Fig. 5). Hereby the middle portion of the combustion chamber 13 and of the cylinder shortly after opening the slots is scavenged by a centric whirl of rotation g directed towards the outlet means (Fig. 8). Fig. 5 indicates by the arrows d, e, f how the radial and tangential currents are conducted into the cylinder, then meet, deflect one another and then jointly continue their course on the line of points of gravity S.

On further opening the slots the directions of the tangential currents are changed, the latter gradually becoming steeper. Hence also the resultants formed by the meeting tangential partial currents gradually follow different lines of points of gravity which on further opening of the slots assume an increasing diameter and convey the scavenging medium in whirls of always increasing diameter through the cylinder. The radial currents are, on further opening, no longer influenced by the tangential currents, as the radial currents now flow below the tangential ones. The radial currents travel more and more to the center.

Figs. 9 and 10 show the course of the currents with the slots fully opened. The currents d scavenge the combustion chamber 13, meet about in the center and erect one another. The currents d then pass in straight lines in the middle of the cylinder to the outlet means and remove satisfactorily the core of waste gases (Fig. 10). The upwards directed tangential currents h upon the cylinder wall 18, are there deflected and pass in a whirl i (Fig. 10) along the wall of the cylinder. The mutual influence of the radial and the tangential currents d and h has ceased.

The modification shown in Figs. 11 to 16 comprises a machine provided with a combustion chamber 50 eccentrically arranged in the piston 19. Hereby extremely difficult scavenging conditions are created, as on the one hand the bowl 50 in the piston 19 must be scavenged and on the other hand the scavenging and the charging air is to accomplish a whirl of rotation in order to promote scavenging and combustion. The scavenging slots 36 to 49 are designed so as to be suitable especially for short-stroke motors or motors having cylinders of greater diameters. According to the invention radial, tangential and opposite-tangential slots are provided, part of the opposed slots or groups of slots being identical and besides being formed to be radial, tangential or opposite-tangential.

The scavenging current 36 is intended to scavenge the bowl 50 in the piston, to erect itself at the edge of the bowl opposite the slot 36 and to take its way near the axis of the cylinder through the latter to the outlet means. By conducting the scavenging medium through the slot to the bowl, above the latter a fall in pressure is produced, i. e. a sort of suction so that the jet m of scavenging medium erected at the edge of the bowl (Fig. 16) does not rise to the exhaust means but might be drawn into this eddy and a whirl-roll formed. Hereby not only the scavenging of the center of the cylinder would be questioned, but above all the whirl of rotation at the wall of the cylinder would be disturbed. To avoid this formation of a whirl, a scavenging current is conducted to this point of the cylinder.

The slots 37 and 49 next to the slot 36 are tangential in opposite directions (see Fig. 12) and their upper and lower faces 51 and 52 pass vertically to the longitudinal axis of the cylinder (see Fig. 13). The currents K of scavenging medium conducted through these two slots into the cylinder and through ports 53 provided in the piston 19 meet at the point A (Fig. 12) where the indicated fall of pressure produced by the scavenging current m would be formed. The partial currents k flow in consequence of the above-mentioned formation of the slots 37 and 49, beneath the partial currents o arriving in the cylinder through the tangential slots 38, 41, 43, 45, and 48, because as seen from Fig. 13 the upper and the lower faces 54 and 55 of these slots are directed more steeply towards the cylinder head. In order that the current resulting from the two currents k can arise at A, the slots 42 and 44 opposite the slots 37 and 49 are accordingly, i. e. likewise opposite-tangentially shaped. The partial currents n (Fig. 16) of these slots 42 and 44 meet at B (Fig. 12). Further by directing the slots 39, 40, 46 and 47 (Fig. 12) to the center, I really attain that a rising of the before-mentioned currents m, k and n at A and B takes place, the partial currents n balancing the partial currents k.

Figure 16:
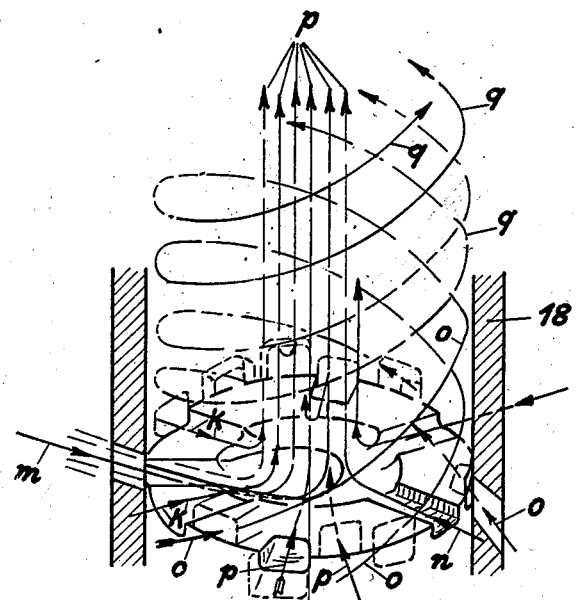
Figs. 15 and 16 are perspective views seen towards the bottom of the piston.
Figure 15:
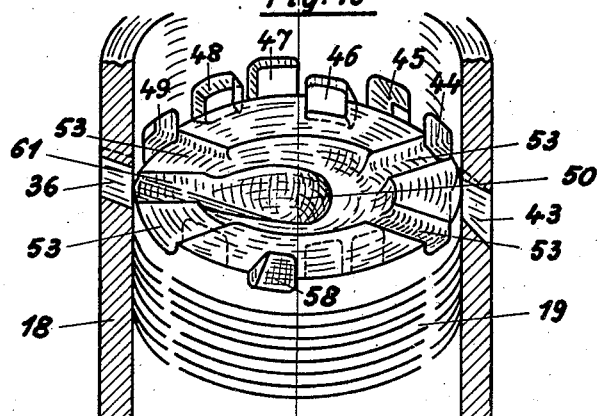

In order that the idea of systematically conducting the single currents on which the invention is based may be realized with the aid of a whirl of rotation without the currents when entering the cylinder disturbing one another, the rotating air current is conducted according to my invention over the current directed towards the center. For this reason the tangential slots 38, 41, 43, 45, and 48 are provided, as already mentioned, with upper and lower faces 54 and 55 directed with corresponding strong inclination towards the cylinder head. The resulting partial currents o bridge the radial currents p without any disturbance resulting and impinge upon the cylinder wall 18. Here the currents o undergo a deflection and are conducted in a rotary whirl q moving along the cylinder wall 18 to the exhaust means (Fig. 16). The radial slots 39 and 46, the lower faces 57 of which form a smaller angle with the longitudinal axis of the cylinder than the upper faces 56 are placed lower than the other slots (Figs. 11 and 15), but have the same height. By recesses 58 provided in the piston 19 at corresponding points the slots 39 and 46 are opened simultaneously with the other slots. By this formation and disposal I further attain that the radial scavenging currents conducted through these slots pass below the tangential currents o without the tangential slots, for instance, 38 and 45 considerably slanting. As seen from Fig. 13, the upper and lower faces 59 and 60 of the radial slots 40 and 47 forming different angles with each other slant more towards the top than the corresponding faces of the radial slots 39 and 46. Hereby still an additional and increased scavenging of the core of waste gases contained in the center of the cylinder is obtained.

The modification shown in Figs. 17 to 20 likewise relates to an engine having a bowl-shaped combustion chamber 50 eccentrically arranged in the bottom of the piston. The wide slot 62 directed towards the bowl 50 is radially arranged and its upper and lower faces 76 and 77 are parallel to each other and inclined downwards. The scavenging medium is conducted into the cylinder through this slot 62 and a port 61 communicating with the bowl 50, and is deflected after having met the edge of the bowl opposite the slot. To prevent the undesired formation of whirls the convergent tangential slots 63 and 75 are provided, the faces 78 and 79 of which are horizontal as shown in Fig. 19. The partial currents conducted through these slots and through ports 53 provided in the bottom of the piston meet at A close above the bowl 50 (Fig. 18) and deflect the current coming from the slot 62 and deflected at the edge of the bowl in such a manner that the undesired formation of a whirl from this partial current is avoided. As the current resulting from these three partial currents coming from slots 62, 63, and 75 is to be deflected upwards to displace the waste gases present above the bowl 50, the slots 67, 69 and 71 are disposed accordingly. The slots 67 and 71 are likewise formed to be tangential and convergent (Fig. 18) and their upper and lower faces 80 and 81 are horizontal (Fig. 19). The two partial currents coming from these slots meet at about B (Fig. 18). The partial current coming from the radial slot 69 is likewise conducted to the point B, and these three partial currents balance the currents coming from the slots 62, 63, and 75, whereby the currents are erected at the desired points inside the cylinder. The slots 64, 66, 68, 70, 72, and 74 directed tangentially in the same sense and at equal angles (Fig. 18) produce a rotary whirl directed towards the exhaust means of the cylinder which whirl passes next to or along the wall 18 of the cylinder, owing to the formation of the upper and lower faces 82 and 83 as chosen, by way of example, in this modification (Fig. 19).

The scavenging currents coming from the flat slots 65 and 73 (Fig. 18) directed to a point near the center of the cylinder and meeting in this point erect each other and assist in scavenging the core of the waste gases. In order that the partial currents conducted through these slots are not disturbed by whirls, for instance, by the partial currents coming from the slots 64 or 72, the opening edges of the slots 65 and 73 are placed at a lower level than the tangential slots and are accordingly later opened by the piston (Fig. 20). Hereby I attain that the nearly radial currents coming from the slots 65 and 73 are flowing below the tangential currents coming from the slots 64 and 72 so that mutual disturbing is prevented and the single currents in fact reach the desired points of the cylinder. This results in the further advantage that the tangential slots need not slant considerably towards the top and a strong relatively flat rotary whirl is produced whereby the zones of waste gases present close above the bottom of the piston are comprised by the rotary whirl.

In accordance with the slots 65 and 73 also the slots 67 and 71 are arranged at a lower level so that their partial currents are not disturbed by the tangential slots 66 and 70 and a satisfactory course of the currents is warranted (see also Fig. 20).

In order to arrange the partial current coming from the radial slot 69 below the rotating current coming from the tangential slot 68 to avoid a mutual disturbance also in this case, the piston 19 is provided in front of the slot 69 with a recess 58 (corresponding to some extent to that in Fig. 14). This slot 69 having the full height like the slots 62, 63, 74, and 75 (see Fig. 20) is consequently opened simultaneously with the slots 62, 63, 64, 66, 68, 70, 72, 74, and 75. Of these slots the slots 64, 66, 68, 70, and 72 have, for example, a smaller height. The same is true of the slots 65, 67, 71, and 73 which however, as explained, are opened later than the other slots.

The course of the scavenging currents in this modification essentially corresponds to Fig. 16.

Of course it is also possible, in order to conduct the single tangential or radial currents to predetermined points in the cylinder as desired, to open the slots, having a reduced height by recesses provided in the piston, simultaneously or later as compared with the opening of the other slots.

Figs. 21 and 22 show a modification acting with a double piston. Here the bottom 84 of the inlet piston 85 or the outlet piston 86 is shaped to form a sort of hollow piston. The radial inlet slots 87, 88, and 89 symmetrically distributed over the wall 18 of the cylinder are directed towards the cavity 90 of the hollow piston.

From Fig. 22 it may be seen that these slots meet in the center of the cylinder whereby the scavenging medium is erected so as to surely and completely expel the waste gases present in the central part of the cylinder. The other inlet slots (not being directed towards the hollow space of the inlet piston) are tangentially directed whereby the scavenging fluid is led in a rotary whirl over the inner surface of the cylinder.

Without departing from the scope of the present invention the "tangential" slots may more or less differ as to the angle formed between their axes and the real tangent applied to the cylinder at the respective point of the periphery, and the single slots may have parallelly or not parallelly directed upper or lower faces forming different angles. A plurality of slots may coact in each case, as described in connection with the above modifications, so that the single partial scavenging currents arrive at predetermined points of the cylinder and are conducted through the cylinder on a predetermined way. By the given combinations of the form and arrangement of the slots then in any case an appropriate scavenging of the waste gases in accordance with the prevailing conditions is obtained. It is likewise possible to shape and dispose several tangential slots in a direction differing from or opposed to that of the others whereby a rotary whirl in opposite direction is produced.

I claim:

1. An internal combustion engine, especially a high-speed two-stroke engine comprising a cylinder provided with a ring of radial and tangential inlet ports opening into the same, in which the upper and the lower faces of the inlet ports distributed over the wall of the cylinder are substantially parallel to one another, and in which the upper and lower faces of at least one of the ports form different angles with the longitudinal central axis of the cylinder.

2. An internal combustion engine provided with a ring of tangential and radial inlet ports distributed over the circumference of the cylinder, in which the upper face of each port forms a smaller angle with the longitudinal axis of the cylinder than the lower face of the same port, whereby during the first part of the opening operation the scavenging currents are at most slightly inclined towards the cylinder head, and after complete opening the inclination is increased.

3. An internal combustion engine in accordance with claim 1, in the piston of which the bowl-shaped combustion chamber is concentrically arranged.

4. An internal combustion engine in accordance with claim 1, in the piston of which the bowl-shaped combustion chamber is eccentrically arranged.

5. An internal combustion engine in accordance with claim 1, in which several groups of ports are formed from several ports, especially opposite in pairs, of which the ports belonging to the same group are equal or unequal.

6. In internal combustion engine comprising a cylinder provided with a ring of tangential and radial inlet ports distributed around the circumference of the cylinder and a hollow piston in which at least one inlet port is directed towards the hollow space of the piston, the piston being provided with at least one duct adapted to connect with an inlet port.

7. An internal combustion high-speed two-stroke engine comprising a cylinder having a ring of tangential and radial inlet ports distributed over the wall of the cylinder and a hollow piston having a combustion chamber in the face thereof, in which the upper and lower faces of at least one port form different angles with the longitudinal central axis of the cylinder, and in which one or more inlet ports compared with the greater part of the inlet ports are off-set as to height relative to the outer dead point of the piston and these ports are directed towards the combustion chamber in the face of the piston in such a manner that the waste gases are removed by gaseous medium entering through said ports.

8. An internal combustion engine comprising a cylinder provided with a ring of tangential and radial inlet ports distributed around the circumference of the cylinder and opposed pistons of which the opposed ends are symmetrically formed, one piston having a concave bowl-shaped combustion chamber and the other a corresponding convex face.

9. An internal combustion engine comprising a cylinder provided with a ring of tangential and radial inlet ports distributed around the circumference of the cylinder and opposed pistons one of which has an asymmetrical bowl-shaped combustion chamber in its face and the other of which has a corresponding convex face.

10. An internal combustion high-speed two-stroke engine comprising a cylinder provided with a ring of tangential and radial inlet ports distributed over the wall of the cylinder and a hollow piston having a combustion chamber in the face thereof, in which the upper and lower faces of at least one port are substantially parallel to one another and in which the upper and lower faces of at least one of the ports form different angles with the longitudinal central axis of the cylinder and at least one inlet port compared with the greater part of the inlet ports is off-set as to height relative to the outer dead point of the piston and these ports are directed towards the combustion chamber provided in the face of the piston in such a manner that the waste gases are removed by the gaseous medium entering through said ports, the greater part of the ports being arranged centrally and the off-set inlet ports being arranged eccentrically relative to the longitudinal central axis of the cylinder.

11. An internal combustion high-speed two-stroke engine comprising a cylinder provided with a ring of tangential and radial inlet ports distributed over the wall of the cylinder and a hollow piston having a combustion chamber in the face thereof, in which the upper and lower faces of at least one port are substantially parallel to one another and in which the upper and lower faces of at least one of the ports form different angles with the longitudinal central axis of the cylinder and at least one inlet port compared with the great part of the inlet ports is off-set as to height relative to the outer dead point of the piston and these ports are directed towards the combustion chamber provided in the face of the piston in such a manner that the waste gases are removed by the gaseous medium entering through said ports, the greater part of the ports being arranged eccentrically and the off-set inlet ports being arranged centrally relative to the longitudinal central axis of the cylinder.

12. An internal combustion high-speed two-stroke engine comprising a cylinder provided with a ring of tangential and radial inlet ports distributed over the wall of the cylinder and a hollow piston having a combustion chamber in the face thereof, in which the upper and lower faces of a plurality of inlet ports are substantially parallel to one another and in which the upper and lower faces of a plurality of the ports form different angles with the longitudinal central axis of the cylinder and a plurality of inlet ports compared with the other inlet port are off-set as to height relative to the outer dead point of the piston and these ports are directed towards the combustion chamber provided in the bottom of the piston in such a manner that the waste gases are removed by gaseous medium entering through said ports, the off-set ports being distributed around the circumference of the cylinder.

FRANZ ZAHREN.